United States Patent
Daniel

(10) Patent No.: US 10,561,942 B2
(45) Date of Patent: Feb. 18, 2020

(54) METRONOME FOR COMPETITIVE GAMING HEADSET

(71) Applicant: Sony Interactive Entertainment America LLC, San Mateo, CA (US)

(72) Inventor: Alvin Daniel, Redwood City, CA (US)

(73) Assignee: Sony Interactive Entertainment America LLC, San Mateo, CA (US)

(*) Notice: Subject to any disclaimer, the term of this patent is extended or adjusted under 35 U.S.C. 154(b) by 0 days.

(21) Appl. No.: 15/595,851

(22) Filed: May 15, 2017

(65) Prior Publication Data

US 2018/0326304 A1 Nov. 15, 2018

(51) Int. Cl.
| | |
|---|---|
| A63F 9/00 | (2006.01) |
| A63F 13/54 | (2014.01) |
| G06F 3/16 | (2006.01) |
| G09B 19/22 | (2006.01) |
| G09B 5/06 | (2006.01) |
| A63F 13/44 | (2014.01) |
| A63F 13/5375 | (2014.01) |

(52) U.S. Cl.
CPC .............. A63F 13/54 (2014.09); A63F 13/44 (2014.09); A63F 13/5375 (2014.09); G06F 3/165 (2013.01); G09B 5/06 (2013.01); G09B 19/22 (2013.01)

(58) Field of Classification Search
None
See application file for complete search history.

(56) References Cited

U.S. PATENT DOCUMENTS

| | | |
|---|---|---|
| 3,147,341 A | 9/1964 | Gibson, Jr. |
| 3,200,193 A | 8/1965 | Biggs et al. |
| 4,016,540 A | 4/1977 | Hyatt |
| 4,090,216 A | 5/1978 | Constable |
| 4,104,625 A | 8/1978 | Bristow et al. |
| 4,355,334 A | 10/1982 | Fitzgibbon et al. |

(Continued)

FOREIGN PATENT DOCUMENTS

| | | |
|---|---|---|
| CN | 1201180 A | 12/1998 |
| CN | 1385783 A | 12/2002 |

(Continued)

OTHER PUBLICATIONS

"Notice of Allowance", European Patent Application No. 10007803.9, dated Oct. 23, 2017, 7 pages.

(Continued)

*Primary Examiner* — Seng Heng Lim
(74) *Attorney, Agent, or Firm* — Carr & Ferrell LLP

(57) ABSTRACT

A system, method, and processor-readable storage medium for providing metronome signals are disclosed. An example method includes receiving at least one metronome timing profile, obtaining an audio stream of a computer game, receiving a player instruction or software instruction, and generating, based on the player or software instruction, metronome signals according to the at least one metronome timing profile. The metronome signals and the audio stream can be combined and output simultaneously. The players can also provide settings for the metronome signals such as a selection of a sound or a frequency. The players can also create and edit metronome timing profiles. The metronome timing profiles can be also shared among players.

18 Claims, 3 Drawing Sheets

(56) References Cited

U.S. PATENT DOCUMENTS

| | | |
|---|---|---|
| 4,445,187 A | 4/1984 | Best |
| 4,475,132 A | 10/1984 | Rodesch |
| 4,514,727 A | 4/1985 | Van Antwerp |
| 4,569,026 A | 2/1986 | Best |
| 4,677,569 A | 6/1987 | Nakano et al. |
| 4,704,696 A | 11/1987 | Reimer et al. |
| 4,752,069 A | 6/1988 | Okada |
| 4,757,525 A | 7/1988 | Matthews et al. |
| 4,952,917 A | 8/1990 | Yabuuchi |
| 5,057,744 A | 10/1991 | Barbier et al. |
| 5,167,010 A | 11/1992 | Elm et al. |
| 5,241,671 A | 8/1993 | Reed et al. |
| 5,274,560 A | 12/1993 | LaRue |
| 5,321,833 A | 6/1994 | Chang et al. |
| 5,358,259 A | 10/1994 | Best |
| 5,377,997 A | 1/1995 | Wilden et al. |
| 5,405,152 A | 4/1995 | Katanics et al. |
| 5,446,714 A | 8/1995 | Yoshio et al. |
| 5,498,002 A | 3/1996 | Gechter |
| RE35,314 E | 8/1996 | Logg |
| 5,598,297 A | 1/1997 | Yamanaka et al. |
| 5,617,407 A | 4/1997 | Bareis |
| 5,649,861 A | 7/1997 | Okano et al. |
| 5,659,732 A | 8/1997 | Kirsch |
| 5,704,837 A | 1/1998 | Iwasaki et al. |
| 5,724,567 A | 3/1998 | Rose et al. |
| 5,732,232 A | 3/1998 | Brush, II et al. |
| 5,751,825 A * | 5/1998 | Myers .................... G04F 5/025 381/118 |
| 5,765,150 A | 6/1998 | Burrows |
| 5,786,801 A | 7/1998 | Ichise |
| 5,802,361 A | 9/1998 | Wang et al. |
| 5,818,553 A | 10/1998 | Koenck et al. |
| 5,823,879 A | 10/1998 | Goldberg et al. |
| 5,870,740 A | 2/1999 | Rose et al. |
| 5,890,122 A | 3/1999 | Van Kleeck et al. |
| 5,947,823 A | 9/1999 | Nimura |
| 5,948,040 A | 9/1999 | DeLorme et al. |
| 5,974,412 A | 10/1999 | Hazlehurst et al. |
| 5,977,968 A | 11/1999 | Le Blanc |
| 6,001,013 A | 12/1999 | Ota |
| 6,012,053 A | 1/2000 | Pant et al. |
| 6,017,272 A | 1/2000 | Rieder |
| 6,064,978 A | 5/2000 | Gardner et al. |
| 6,067,539 A | 5/2000 | Cohen |
| 6,098,061 A | 8/2000 | Gotoh et al. |
| 6,155,924 A | 12/2000 | Nakagawa et al. |
| 6,168,524 B1 | 1/2001 | Aoki et al. |
| 6,183,366 B1 | 2/2001 | Goldberg et al. |
| 6,202,058 B1 | 3/2001 | Rose et al. |
| 6,210,273 B1 | 4/2001 | Matsuno |
| 6,241,524 B1 | 6/2001 | Aoshima et al. |
| 6,264,560 B1 | 7/2001 | Goldberg et al. |
| 6,273,818 B1 | 8/2001 | Komoto |
| 6,283,861 B1 | 9/2001 | Kawai et al. |
| 6,296,570 B1 | 10/2001 | Miyamoto et al. |
| 6,319,121 B1 | 11/2001 | Yamada et al. |
| 6,327,590 B1 | 12/2001 | Chidlovskii et al. |
| 6,363,378 B1 | 3/2002 | Conklin et al. |
| 6,366,272 B1 | 4/2002 | Rosenberg et al. |
| 6,375,571 B1 | 4/2002 | Ohnuma et al. |
| 6,409,604 B1 | 6/2002 | Matsuno |
| 6,413,163 B1 | 7/2002 | Yamauchi et al. |
| 6,419,580 B1 | 7/2002 | Ito |
| 6,428,411 B1 | 8/2002 | Togami |
| 6,434,556 B1 | 8/2002 | Levin et al. |
| 6,456,977 B1 | 9/2002 | Wang |
| 6,508,706 B2 | 1/2003 | Sitrick et al. |
| 6,529,875 B1 | 3/2003 | Nakajima et al. |
| 6,533,663 B1 | 3/2003 | Iwao et al. |
| 6,538,666 B1 | 3/2003 | Ozawa et al. |
| 6,554,707 B1 | 4/2003 | Sinclair et al. |
| 6,556,983 B1 | 4/2003 | Altschuler et al. |
| 6,571,208 B1 | 5/2003 | Kuhn et al. |
| 6,572,478 B2 | 6/2003 | Miyamoto et al. |
| 6,582,230 B1 | 6/2003 | Aoshima et al. |
| 6,582,309 B2 | 6/2003 | Higurashi et al. |
| 6,585,599 B1 | 7/2003 | Horigami et al. |
| 6,652,384 B2 | 11/2003 | Kondo et al. |
| 6,684,127 B2 | 1/2004 | Fujita et al. |
| 6,705,945 B2 | 3/2004 | Gavin et al. |
| 6,729,954 B2 | 5/2004 | Atsumi et al. |
| 6,826,552 B1 | 11/2004 | Grosser et al. |
| 6,899,628 B2 | 5/2005 | Leen et al. |
| 6,920,426 B2 | 7/2005 | Takechi |
| 6,928,433 B2 | 8/2005 | Goodman et al. |
| 6,935,954 B2 | 8/2005 | Sterchi et al. |
| 6,966,832 B2 | 11/2005 | Leen et al. |
| 6,979,267 B2 | 12/2005 | Leen et al. |
| 7,029,394 B2 | 4/2006 | Leen et al. |
| 7,062,561 B1 | 6/2006 | Reisman |
| 7,085,722 B2 | 8/2006 | Luisi |
| 7,137,891 B2 | 11/2006 | Neveu et al. |
| 7,155,157 B2 | 12/2006 | Kaplan |
| 7,172,118 B2 | 2/2007 | Urken |
| 7,180,529 B2 | 2/2007 | Covannon et al. |
| 7,202,613 B2 | 4/2007 | Morgan et al. |
| 7,233,904 B2 | 6/2007 | Luisi |
| 7,438,642 B2 | 10/2008 | Walker et al. |
| 7,452,273 B2 | 11/2008 | Amaitis et al. |
| 7,455,589 B2 | 11/2008 | Neveu et al. |
| 7,572,187 B2 | 8/2009 | Van Luchene |
| 7,613,616 B2 | 11/2009 | Luisi |
| 7,717,782 B2 | 5/2010 | Van Luchene |
| 7,731,589 B2 | 6/2010 | Kataoka et al. |
| 7,764,026 B2 | 7/2010 | Dowling et al. |
| 7,880,746 B2 | 2/2011 | Marks et al. |
| 7,946,909 B2 | 5/2011 | Neveu et al. |
| 7,965,859 B2 | 6/2011 | Marks |
| 8,295,549 B2 | 10/2012 | Marks et al. |
| 8,442,403 B2 | 5/2013 | Weaver |
| 8,714,983 B2 | 5/2014 | Kil |
| 8,799,250 B1 | 8/2014 | Smith et al. |
| 8,964,298 B2 | 2/2015 | Haddick et al. |
| 9,108,108 B2 | 8/2015 | Zalewski et al. |
| 9,126,116 B2 | 9/2015 | Turner et al. |
| 9,155,960 B2 | 10/2015 | Argiro |
| 9,626,689 B1 * | 4/2017 | Bethke .................... A63F 13/85 |
| 9,833,707 B2 | 12/2017 | Watson |
| 9,950,259 B2 | 4/2018 | Watson |
| 10,128,914 B1 | 11/2018 | Calabrese |
| 2001/0009867 A1 | 7/2001 | Sakaguchi et al. |
| 2002/0068626 A1 | 6/2002 | Takeda et al. |
| 2002/0082065 A1 | 6/2002 | Fogel et al. |
| 2002/0103031 A1 | 8/2002 | Neveu et al. |
| 2002/0169617 A1 | 11/2002 | Luisi |
| 2003/0065636 A1 | 4/2003 | Peyrelevade |
| 2003/0109305 A1 | 6/2003 | Gavin et al. |
| 2003/0177347 A1 | 9/2003 | Schneier et al. |
| 2004/0029625 A1 | 2/2004 | Annunziata |
| 2004/0166935 A1 | 8/2004 | Gavin et al. |
| 2005/0054290 A1 | 3/2005 | Logan et al. |
| 2005/0170828 A1 | 8/2005 | Nakamura et al. |
| 2005/0174889 A1 * | 8/2005 | Marcantonio ........ G04G 13/028 368/12 |
| 2005/0191969 A1 | 9/2005 | Mousseau |
| 2005/0275508 A1 | 12/2005 | Orr et al. |
| 2006/0039017 A1 | 2/2006 | Park et al. |
| 2006/0178179 A1 | 8/2006 | Neveu et al. |
| 2006/0190270 A1 | 8/2006 | Luisi |
| 2007/0037605 A1 | 2/2007 | Logan |
| 2007/0060231 A1 | 3/2007 | Neveu et al. |
| 2007/0087797 A1 | 4/2007 | Van Luchene |
| 2007/0099709 A1 * | 5/2007 | Okada .................... A63F 13/08 463/46 |
| 2007/0244704 A1 | 10/2007 | Luisi |
| 2007/0257928 A1 | 11/2007 | Marks et al. |
| 2007/0273848 A1 * | 11/2007 | Fan ........................ G03B 29/00 353/119 |
| 2007/0279427 A1 | 12/2007 | Marks |
| 2008/0064019 A1 | 3/2008 | Kaufman et al. |
| 2008/0109491 A1 | 5/2008 | Gupta |
| 2008/0167106 A1 | 7/2008 | Lutnick et al. |
| 2008/0220869 A1 | 9/2008 | Midgley et al. |

(56) References Cited

U.S. PATENT DOCUMENTS

| | | | |
|---|---|---|---|
| 2008/0294782 A1* | 11/2008 | Patterson | A63F 13/12 709/227 |
| 2009/0054814 A1 | 2/2009 | Schnapp et al. | |
| 2009/0063463 A1 | 3/2009 | Turner et al. | |
| 2009/0119234 A1 | 5/2009 | Pinckney et al. | |
| 2010/0041475 A1 | 2/2010 | Zalewski et al. | |
| 2010/0111374 A1 | 5/2010 | Stoica | |
| 2010/0138764 A1 | 6/2010 | Hatambeiki et al. | |
| 2010/0171430 A1 | 7/2010 | Seydoux | |
| 2010/0174593 A1* | 7/2010 | Cao | A63F 13/12 705/14.12 |
| 2010/0194578 A1* | 8/2010 | Zhang | H04N 5/63 340/679 |
| 2010/0213873 A1 | 8/2010 | Picard et al. | |
| 2010/0241496 A1 | 9/2010 | Gupta et al. | |
| 2010/0302033 A1* | 12/2010 | Devenyi | H04R 1/1041 340/540 |
| 2010/0312366 A1 | 12/2010 | Madonna et al. | |
| 2011/0033830 A1* | 2/2011 | Cherian | G09B 5/02 434/236 |
| 2012/0021388 A1* | 1/2012 | Arbuckle | A23L 33/30 434/127 |
| 2012/0088213 A1* | 4/2012 | Soltanoff | G09B 19/00 434/247 |
| 2013/0344960 A1* | 12/2013 | Perry | A63F 13/12 463/32 |
| 2014/0068755 A1* | 3/2014 | King | H04W 12/08 726/19 |
| 2014/0121009 A1 | 5/2014 | Watson | |
| 2014/0132628 A1 | 5/2014 | Hoff | |
| 2014/0135631 A1 | 5/2014 | Brumback et al. | |
| 2014/0142403 A1 | 5/2014 | Brumback et al. | |
| 2014/0143424 A1* | 5/2014 | Rostaing | H04L 41/24 709/226 |
| 2014/0191848 A1 | 7/2014 | Imes et al. | |
| 2014/0329613 A1 | 11/2014 | Savarese et al. | |
| 2014/0361872 A1 | 12/2014 | Garcia et al. | |
| 2015/0005911 A1* | 1/2015 | Lake, II | G06Q 50/22 700/91 |
| 2015/0087369 A1* | 3/2015 | McIntyre | G07F 17/3225 463/11 |
| 2015/0141005 A1 | 5/2015 | Suryavanshi et al. | |
| 2015/0304804 A1 | 10/2015 | Lotito | |
| 2015/0347738 A1 | 12/2015 | Ulrich et al. | |
| 2016/0018934 A1 | 1/2016 | Turner et al. | |
| 2016/0057565 A1 | 2/2016 | Gold | |
| 2016/0282899 A1 | 9/2016 | Inagaki et al. | |
| 2017/0368459 A1 | 12/2017 | Watson | |
| 2018/0091193 A1 | 3/2018 | Hagedorn | |
| 2019/0074868 A1 | 3/2019 | Calabrese | |

FOREIGN PATENT DOCUMENTS

| | | |
|---|---|---|
| CN | 1848742 A | 10/2006 |
| CN | 101836362 A | 9/2010 |
| CN | 101849436 A | 9/2010 |
| CN | 101968827 A | 2/2011 |
| CN | 101968827 B | 5/2014 |
| CN | 104797311 A | 7/2015 |
| CN | 104797311 B | 9/2018 |
| CN | 109107149 A | 1/2019 |
| DE | 19905076 A1 | 6/2002 |
| EP | 0789296 A1 | 8/1997 |
| EP | 0850673 A1 | 7/1998 |
| EP | 0898237 A2 | 2/1999 |
| EP | 0901803 A1 | 3/1999 |
| EP | 0913175 A2 | 5/1999 |
| EP | 1029569 A2 | 8/2000 |
| EP | 1078661 A1 | 2/2001 |
| EP | 1262955 A2 | 12/2002 |
| EP | 1355707 A1 | 10/2003 |
| EP | 1388357 A2 | 2/2004 |
| EP | 1434627 A1 | 7/2004 |
| EP | 1630754 A1 | 3/2006 |
| EP | 1650706 A1 | 4/2006 |
| EP | 1793588 A1 | 6/2007 |
| EP | 1262955 B1 | 3/2010 |
| EP | 2322257 A2 | 5/2011 |
| EP | 2322257 B1 | 4/2018 |
| GB | 2355627 A | 9/1998 |
| GB | 2351637 A | 1/2001 |
| GB | 2356785 A | 5/2001 |
| GB | 2411065 A | 8/2005 |
| JP | S59202779 A | 11/1984 |
| JP | H07178246 A | 7/1995 |
| JP | H08155140 A | 6/1996 |
| JP | H09265379 A | 10/1997 |
| JP | H10272258 A | 10/1998 |
| JP | H10295935 A | 11/1998 |
| JP | H11000467 A | 1/1999 |
| JP | H11070273 A | 3/1999 |
| JP | H11119791 A | 4/1999 |
| JP | H11197359 A | 7/1999 |
| JP | 2000024322 A | 1/2000 |
| JP | 2000116946 A | 4/2000 |
| JP | 2000176154 A | 6/2000 |
| JP | 2000334168 A | 12/2000 |
| JP | 2001009156 A | 1/2001 |
| JP | 2001029649 A | 2/2001 |
| JP | 2001079265 A | 3/2001 |
| JP | 2001157779 A | 6/2001 |
| JP | 2001198350 A | 7/2001 |
| JP | 2002052256 A | 2/2002 |
| JP | 2002085835 A | 3/2002 |
| JP | 2002092474 A | 3/2002 |
| JP | 2002159740 A | 6/2002 |
| JP | 2002166048 A | 6/2002 |
| JP | 2002191868 A | 7/2002 |
| JP | 2003047768 A | 2/2003 |
| JP | 2003228585 A | 8/2003 |
| JP | 2004529678 A | 9/2004 |
| JP | 2005505357 A | 2/2005 |
| JP | 3741687 B2 | 2/2006 |
| JP | 2006031670 A | 2/2006 |
| JP | 2006087459 A | 4/2006 |
| JP | 2006099125 A | 4/2006 |
| JP | 3865721 B2 | 1/2007 |
| JP | 2007249899 A | 9/2007 |
| JP | 2011025044 A | 2/2011 |
| JP | 5580131 B2 | 8/2014 |
| KR | 1020000072753 A | 12/2000 |
| KR | 100464877 B1 | 12/2004 |
| KR | 100469822 B1 | 1/2005 |
| KR | 1020020044919 A | 6/2005 |
| KR | 1020070052493 A | 9/2008 |
| KR | 101226305 B1 | 1/2013 |
| WO | WO1994018790 A1 | 8/1994 |
| WO | WO9714102 A1 | 4/1997 |
| WO | WO2001082626 A1 | 11/2001 |
| WO | WO2002060548 A2 | 8/2002 |
| WO | WO2003031003 A1 | 4/2003 |
| WO | WO2005040900 A1 | 5/2005 |
| WO | WO2006033360 A1 | 3/2006 |
| WO | WO2007130641 A2 | 11/2007 |
| WO | WO2009052659 A1 | 4/2009 |
| WO | WO2009060376 A1 | 5/2009 |
| WO | WO2014070677 A2 | 5/2014 |
| WO | WO2019050692 A1 | 3/2019 |

OTHER PUBLICATIONS

"Office Action", Chinese Patent Application No. 201380056819.3, dated Dec. 18, 2017, 3 pages [7 pages including translation].

Non-Final Office Action, dated Dec. 17, 2003, U.S. Appl. No. 09/859,034, filed May 14, 2001.

Final Office Action, dated Jun. 4, 2004, U.S. Appl. No. 09/859,034, filed May 14, 2001.

Advisory Action, dated Aug. 25, 2004, U.S. Appl. No. 09/859,034, filed May 14, 2001.

Non-Final Office Action, dated Jan. 19, 2005, U.S. Appl. No. 09/859,034, filed May 14, 2001.

(56) References Cited

OTHER PUBLICATIONS

Final Office Action, dated Jun. 24, 2005, U.S. Appl. No. 09/859,034, filed May 14, 2001.
Advisory Action, dated Sep. 2, 2005, U.S. Appl. No. 09/859,034, filed May 14, 2001.
Notice of Allowance, dated Jan. 13, 2006, U.S. Appl. No. 09/859,034, filed May 14, 2001.
Non-Final Office Action, dated Nov. 17, 2005, U.S. Appl. No. 10/364,951, filed Feb. 11, 2003.
Final Office Action, dated May 16, 2006, U.S. Appl. No. 10/364,951, filed Feb. 11, 2003.
Advisory Action, dated Aug. 18, 2006, U.S. Appl. No. 10/364,951, filed Feb. 11, 2003.
Non-Final Office Action, dated Feb. 5, 2007, U.S. Appl. No. 10/364,951, filed Feb. 11, 2003.
Non-Final Office Action, dated Jul. 9, 2003, U.S. Appl. No. 10/268,278, filed Oct. 9, 2002.
Notice of Allowance, dated Dec. 2, 2003, U.S. Appl. No. 10/268,278, filed Oct. 9, 2002.
Non-Final Office Action, dated Dec. 30, 2004, U.S. Appl. No. 10/791,476, filed Mar. 1, 2004.
Non-Final Office Action, dated Apr. 5, 2006, U.S. Appl. No. 10/791,476, filed Mar. 1, 2004.
Final Office Action, dated Oct. 24, 2006, U.S. Appl. No. 10/791,476, filed Mar. 1, 2004.
Notice of Allowance, dated Feb. 16, 2007, U.S. Appl. No. 11/403,716, filed Apr. 13, 2006.
Non-Final Office Action, dated Feb. 25, 2003, U.S. Appl. No. 09/773,452, filed Jan. 31, 2001.
Non-Final Office Action, dated Jun. 5, 2003, U.S. Appl. No. 09/773,452, filed Jan. 31, 2001.
Final Office Action, dated Jun. 1, 2004, U.S. Appl. No. 09/773,452, filed Jan. 31, 2001.
Final Office Action, dated Sep. 24, 2004, U.S. Appl. No. 09/773,452, filed Jan. 31, 2001.
Advisory Action, dated May 4, 2005, U.S. Appl. No. 09/773,452, filed Jan. 31, 2001.
Non-Final Office Action, dated Sep. 13, 2005, U.S. Appl. No. 09/773,452, filed Jan. 31, 2001.
Final Office Action, dated Mar. 16, 2006, U.S. Appl. No. 09/773,452, filed Jan. 31, 2001.
Notice of Allowance, dated Jul. 11, 2006, U.S. Appl. No. 09/773,452, filed Jan. 31, 2001.
Non-Final Office Action, dated Jun. 2, 2008, U.S. Appl. No. 11/375,296, filed Mar. 13, 2006.
Notice of Allowance, dated Sep. 25, 2008, U.S. Appl. No. 11/375,296, filed Mar. 13, 2006.
Non-Final Office Action, dated Mar. 25, 2010, U.S. Appl. No. 11/624,886, filed Jan. 19, 2007.
Final Office Action, dated Aug. 24, 2010, U.S. Appl. No. 11/624,886, filed Jan. 19, 2007.
Notice of Allowance, dated Feb. 18, 2011, U.S. Appl. No. 11/624,886, filed Jan. 19, 2007.
Non-Final Office Action, dated May 2, 2008, U.S. Appl. No. 11/591,314, filed Oct. 31, 2006.
Non-Final Office Action, dated Aug. 2, 2010, U.S. Appl. No. 11/591,314, filed Oct. 31, 2006.
Notice of Allowance, dated Jan. 13, 2011, U.S. Appl. No. 11/591,314, filed Oct. 31, 2006.
Notice of Allowance, dated Sep. 18, 2009, U.S. Appl. No. 11/764,795, filed Jun. 18, 2007.
Non-Final Office Action, dated Apr. 1, 2011, U.S. Appl. No. 11/850,516, filed Sep. 5, 2007.
Final Office Action, dated Sep. 15, 2011, U.S. Appl. No. 11/850,516, filed Sep. 5, 2007.
Non-Final Office Action, dated Dec. 3, 2013, U.S. Appl. No. 11/850,516, filed Sep. 5, 2007.
Notice of Allowance, dated Jun. 19, 2014, U.S. Appl. No. 11/850,516, filed Sep. 5, 2007.
Non-Final Office Action, dated Aug. 11, 2014, U.S. Appl. No. 11/850,516, filed Sep. 5, 2007.
Notice of Allowance, dated Jan. 16, 2015, U.S. Appl. No. 11/850,516, filed Sep. 5, 2007.
Non-Final Office Action, dated Dec. 3, 2013, U.S. Appl. No. 12/509,848, filed Jul. 27, 2009.
Non-Final Office Action, dated May 29, 2014, U.S. Appl. No. 12/509,848, filed Jul. 27, 2009.
Non-Final Office Action, dated Sep. 19, 2014, U.S. Appl. No. 12/509,848, filed Jul. 27, 2009.
Final Office Action, dated Feb. 25, 2015, U.S. Appl. No. 12/509,848, filed Jul. 27, 2009.
Notice of Allowance, dated Jun. 19, 2015, U.S. Appl. No. 12/509,848, filed Jul. 27, 2009.
Non-Final Office Action, dated Sep. 12, 2016, U.S. Appl. No. 13/663,262, filed Oct. 29, 2012.
Non-Final Office Action, dated May 9, 2017, U.S. Appl. No. 13/663,262, filed Oct. 29, 2012.
Notice of Allowance, dated Sep. 19, 2017, U.S. Appl. No. 13/663,262, filed Oct. 29, 2012.
"International Search Report" Patent Cooperation Treaty Application No. PCT/US02/02710, dated Sep. 12, 2002, 3 pages.
"Office Action", European Patent Application No. 02704295.1, dated Apr. 23, 2004, 3 pages.
"Office Action", European Patent Application No. 02704295.1, dated Dec. 15, 2004, 4 pages.
"Office Action", European Patent Application No. 02704295.1, dated Apr. 12, 2006, 10 pages.
"Office Action", China Patent Application No. 2010102454118, dated Sep. 7, 2012, 3 pages [11 pages with translation].
"Office Action", European Patent Application No. 10007803.9, dated Aug. 8, 2013, 6 pages.
"Office Action", Japan Patent Application No. 2010-167803, dated Mar. 26, 2013, 3 pages [6 pages with translation].
Rejection dated Mar. 16, 2012 in KR Application No. 10-2010-0072613.
"International Search Report & Written Opinion", Patent Cooperation Treaty Application No. PCT/US2013/067135, dated May 1, 2014, 18 pages.
Rejection dated Mar. 2, 2004 in KR Application No. 10-2002-00265621.
Decision to Grant dated Oct. 5, 2005 in JP Application 2002-5607373.
Rejection dated Nov. 16, 2003 in JP Application 2002-5607373.
"Office Action", China Patent Application No. 201010245413.8, dated Nov. 5, 2013, 4 pages [12 pages with translation].
"European Search Report", European Patent Application No. 03254168.2, dated Apr. 23, 2004, 3 pages.
"Office Action", European Patent Application No. 03254168.2, dated Sep. 29, 2006, 4 pages.
Stern, Andrew. Virtual Babyz: Believeable agents with Narrative Intelligence, Narrative Intelligence AAAI Symposium, Nov. 1999. Online. Viewed Apr. 28, 2006. http://www.cs.cmu.edu/afs/cs/user/michaelm/www/nidocs/Stern.html, 7 pages.
"Babyz Features Page." Online. Viewed May 3, 2006. www.babyz.net/features.html, 1 page.
"Babyz". Wikipedia online reference. Viewed May 1, 2006. http://en.wikipedia.or.q/wiki/babyz, 2 pages.
Northwestern University CS395, Game Design Course "Simulation and Modeling: Under the Hood of the Sims", Spring 2002. http://www.cs.northwestern.edu/%7Eforbus/c95-gd/lectures/The_Sims_Under_the_Hood_files/frame.htm, 32 pages.
Simpson, Dan. "The Complete Sims Guide" Feb. 6, 2005, pertinent sections printed from the Internet, may also be found in its entirety at: http://www.neoseeker.com/resourcelink.html?rlid=16238&rid=15516, 18 pages.
"Sequence Paradium 2—Laughter in the Dark—Tactical Guidebook", First Edition, Keibunsha Inc., Feb. 10, 2005, pp. 5-32.
Sprigg, Sean M., Patent Examiner, Examiner's Affidavit, Nov. 9, 2005, 5 pages.
Stern, Andrew. "Andrew Stern". Online. Viewed Apr. 28, 2006. http://quvu.net/andrew/resume.html, 6 pages.

(56) References Cited

OTHER PUBLICATIONS

Stewart, Nick. "The Adrenaline Vault Review of the Sims", Mar. 9, 2000. Printed from the Internet, 5 pages.
Decision to Grant / Notice of Allowance dated Jun. 3, 2014 in JP 2010167803 filed Jul. 27, 2010.
"Office Action", Japan Patent Application No. 2003-288128, dated Mar. 15, 2005.
"Office Action", Japan Patent Application No. 2003-288128, dated Dec. 13, 2005.
Notice of Allowance dated Oct. 31, 2012 in KR 10-2010-0072613.
"Office Action", European Patent Application No. 10007803.9, dated Sep. 29, 2014, 4 pages.
"Office Action", China Patent Application No. 201380056819.3, dated Nov. 15, 2016, 6 pages [16 pages including translation].
"Office Action," Chinese Patent Application No. 201380056819.3, dated Jun. 23, 2017, 3 pages [7 pages including translation].
Arcadia, vol. 2, No. 12, Enterbrain, Inc., Dec. 1, 2001, pp. 56-63.
Konami Corporation, Konami Official Guide Perfect Series, Tokimeki Memorial—Forever with You: Official Guide, First Edition, Jun. 29, 1997, 19 pages [37 pages with translation].
Login, vol. 21, No. 4, Enterbrain, Inc. Apr. 1, 2002, pp. 70-77.
Reynolds, Craig, "Flocks, Herds, and Schools: A Distributed Behavioral Model," Proceedings of SIGGRAPH '87, Computer Graphics 21(4), Jul. 1987, 13 pages.
Reynolds, Craig, "Interaction with Groups of Autonomous Characters," Proceedings of Game Developer Conference 2000, San Francisco, CA 2000, 12 pages.
Reynolds, Craig, "Steering Behaviors for Autonomous Characters," Proceedings of Game Developers Conference 1999, 21 pages.
Super Mario Brothers: Complete Cheat Book, Tokuma Publishing Co., Ltd., Nov. 20, 1985, p. 9.
Yu, Bin et al., "A Social Mechanism of Reputation Management in Electronic Communities," Proceedings of 4th International Workshop on Cooperative Information Agents, 2000, 12 pages.
Aguilera, S. et al., "Impaired Persons Facilities Based on a Multi-Modality Speech Processing System," Proc. on Speech & Language Tech., 1993, 4 pages.
Arons, B., "Authoring and Transcription Tools for Speech-Based Hypermedia," Proc. of American Voice I/O Society, 1991, 6 pages.
Arons, B., "Hyperspeech: Navigating in Speech-Only Hypermedia," Proc. of Hypertext, Dec. 1991, pp. 133-146.
Bennacef, S.K., A Spoken Language System for Information Retrieval Proc. of ICSLP, Sep. 1994, 4 pages.
Gauvain, J.L. et al., "Speech Recognition for an Information Kiosk," Proc. of ICSLP, 1996, 4 pages.
Gauvain, J.L. et al., "Spoken Language Component of the MASK Kiosk," Human Comfort and Security fo Information Systems, Oct. 26, 1995, 11 pages.
Gauvain, J.L. et al., "The LIMSI Continuous Speech Dictation System," Proc. ARPA Human Lang. & Technology, Apr. 1994, 6 pages.
Gauvain, J.L. et al., "The LIMSI Continuous Speech Dictation System: Evaluation on the ARPA Wall Street Journal Task," Proc. of the IEEE-ICASSP, 1994, 4 pages.
Goddeau, D. et al., "Galaxy: A Human-Language Interface to On-Line Travel Information," Proc. of ICSLP, 1994, 4 pages.
House, D., "Spoken-Language Access to Multimedia (SLAM): Masters Thesis," Oregon Graduate Inst., Dept. of CS and Eng., 1995, 59 pages.
Mostow, Jack et al., "Towards a Reading coach That Listens: Automated Detection of Oral Reading Errors", Proc. of the 11th Ntl. Conf. on A.I., 1993, 6 pages.
Russell, M. et al., "Applications of Automatic Speech Recognition to Speech and Language Development in Young Children," Proc. of ICSLP, 1996, 4 pages.
Lamel, L.F. et al., "Recent Developments in Spoken Language Systems for Information Retrieval," ESCA ETRW Spoken Dialog Systems, 1995, 4 pages.
Language Industry Monitor, "Janet Baker's Optimism," 1992, 2 pages.

Dorsey et al., Design and Simulation of Opera Lighting and Projection Effects, Program of Computer Graphics, Computer Graphics, Jul. 1991, vol. 25, No. 4, New York, pp. 41-50.
Calvert, Justin, SCEE's latest plans for its Eye Toy peripheral will effectively turn the PlayStation 2 into a videophone. First screens inside, SCEE announces Eye Toy; Chat, Game spot, http://www.gamespot.com/news/6095429.html, May 5, 2004, 1 page.
Nayer et al., Lighting Sensitivity Display, ACM Transactions on Graphics, Oct. 2004, vol. 23, No. 4, pp. 963-979, New York, pp. 963-979.
Spagnoletti, Philips Ambilight TV, Home Entertainment, engadget, Jul. 8, 2004, 1 page.
Wikipedia Article on Diablo II, http://en.wikipedia.org/wiki/Diablo_II, 2010, 8 pages.
Diablo II Frost nova Description, http://diablo2.diablowiki.net/Frost_Nova, Oct. 30, 2009, 5 pages.
Diefendorff, "Sony's Emotionally Charged Chip", Microprocessor Report, vol. 13, No. 5, Apr. 19, 1999, 8 pages.
Sony Computer Entertainment, Inc., "Fantavision Game Manual", 2000, 18 pages.
Wikipedia, "Aimbot", http://en.wikipedia.org/wiki/Aimbot (last updated Jun. 3, 2005; last accessed Jul. 5, 2005), 1 page.
Agarwal et al., "Ranking database Queries Using User Feedback: A Neural network Approach", CS511 Project, Advanced Database Management Systems, Fall 2006, 9 pages.
Agichtein et al., "Improving Web Search Ranking by Incorporating User Behavior Information", SIGIR 2006, Aug. 6-11, ACM, 8 pages.
Bhattacharjee et al., "Incentive Based ranking Mechanisms", Position Paper, Department of Computer Science, Stanford University, 2006, 7 pages.
Chaudhuri et al., "Probabilistic Information Retrieval Approach for Ranking of Databased Query Results," 2006, 43 pages.
Chidlovskii et al., "Collaborative Re-Ranking of Search Results", Xerox Research Centre Europe, AAAI-2000, Workshop on AI for Web Search, 2001, 5 pages.
Kang et al., Establishing Value Mappings Using Statistical Models and User Feedback, CIKM '05, Oct. 31-Nov. 5, 2005, ACM, 8 pages.
W3C Working Draft Jun. 18, 2007, The XMLHttpRequest Object, W3C, http://www.w3.org/TR/2007/WD-XMLHttpRequest-20070618/, 12 pages.
European Search Report, dated Jan. 19, 2004, European Patent Application No. 02009339.9, 2 pages.
"Office Action", European Patent Application No. 02009339.9, dated Jan. 19, 2006, 5 pages.
"Office Action", European Patent Application No. 02009339.9, dated Dec. 11, 2006, 3 pages.
"Office Action", European Patent Application No. 02009339.9, dated Jul. 4, 2007, 4 pages.
"Office Action", European Patent Application No. 02009339.9, dated Sep. 17, 2008, 4 pages.
"Notice of Allowance", European Patent Application No. 02009339.9, dated Nov. 16, 2009, 33 pages.
"International Search Report", Patent Cooperation Treaty Application No. PCT/US02/32438, dated Feb. 4, 2013, 1 page.
"International Search Report" Patent Cooperation Treaty Application No. PCT/US2007/010944, dated Feb. 18, 2008, 5 pages.
"Search Report", European Application No. 02769043.7, dated Dec. 21, 2004, 4 pages.
"Office Action", European Patent Application No. 02769043.7, dated Apr. 28, 2005, 6 pages.
"Office Action", European Patent Application No. 02769043.7, dated Oct. 24, 2006, 5 pages.
"Office Action", European Patent Application No. 02769043.7, dated Jan. 31, 2007, 3 pages.
"Notice of Allowance", Chinese Patent Application No. 201380056819.3, dated Jun. 8, 2018, 2 pages [4 pages including translation].
"International Search Report" and "Written Opinion of the International Searching Authority," Patent Cooperation Treaty Application No. PCT/US2018/047694, dated Sep. 21, 2018, 12 pages.
Ohashi et al. "A Gesture Recognition Method for a Stick Input System ." Transactions of the Information Processing Society of

(56) References Cited

OTHER PUBLICATIONS

Japan 40, No. 2 (1999) [retrieved on Mar. 19, 2014]. Retrieved from the Internet: <URL: http://ci.nii.ac.jp/haid/110002764810>. 12 pages.
Ricadela, A., "Texts Share Tips for Enhancing Play in Popular PC and Console Titles—Books Present Natural Add-On Sales for Games," Computer Retail Week, 8(22), 30 [online], 1998 [retrieved on Jul. 19, 2019], Retrieved from the Internet: <URL:https://dialog.proquest.com/professional/docview/667110627?accountid=142257>, 2 pages.

* cited by examiner

METRONOME FOR COMPETITIVE GAMING HEADSET

BACKGROUND

Technical Field

This disclosure generally relates to computer games, video games, and gaming equipment for playing computer or video games. More particularly, this disclosure relates to systems and methods for providing metronome signals to players based on predetermined settings.

Background

Computer and video games include a wide range of different categories or genres of games. Some examples include first person shooters, sports games, action games, puzzles, real-time strategies, simulations, role-playing games, educational games, virtual reality games, and so forth. Many games can be played by more than one player.

Player game skills can be improved with proper training and practice. For example, a player can engage in a training to improve his skills of operating a trackball, keyboard, joystick, or game console to be more effective in performing certain game actions, operating virtual equipment (e.g., virtual guns), and completing game tasks. Moreover, training and practice can improve player abilities to better navigate and orient within a virtual game environment.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

In one example embodiment of this disclosure, there is provided a method for generating metronome signals. An example method can include receiving or maintaining, by a computing device, at least one metronome timing profile; obtaining, by the computing device, an audio stream of a computer game; generating, by the computing device or headphones, the audio stream of the computer game; receiving, by the computing device, a player instruction or a software instruction; and, based on the player instruction or the software instruction, generating, by the computing device or the headphones, metronome signals according to the at least one metronome timing profile, wherein the metronome signals and the audio stream are combined and output simultaneously.

In certain embodiments of the disclosure, the method may further include obtaining, by the computing device, one or more settings for the metronome signals, wherein the metronome signals are output through the headphones according to the at least one metronome timing profile and settings. The settings can include a sound selection of the metronome signals, a frequency of generating the metronome signals, and/or an instructions concerning recurrence of metronome signals.

In some embodiments, the metronome timing profile can be configured to cause generating the metronome signals repeatedly with a predetermined frequency. The predetermined frequency can be within a range from about 1 second to about 3,600 seconds. The predetermined frequency can also be automatically selected based on a game level or a player skill level (i.e., based on player skills). In some implementations, the predetermined frequency can include at least a first duty cycle and a second duty cycle, where a frequency of the first duty cycle differs from a frequency of the second duty cycle.

In certain embodiments of the disclosure, the method may further comprise sharing, by the computing device, the at least one metronome timing profile with another computing device based on a player input by the computing device. In yet further embodiments of the disclosure, the method may include providing, by the computing device, a graphical user interface (GUI) to enable a player to create and update the at least one metronome timing profile, wherein the GUI is further configured to allow the player to activate and deactivate generating of the metronome signals.

The computing device can be a personal computer, mobile device, or gaming console. Thus, the computing device can be communicatively coupled to the headphones, either by a wired or wireless connection. In other implementations, the computing device can be integrated into the headphones. In some embodiments, the metronome signals can include audio signals only; however, in other embodiments, the metronome signals can include both audio signals and displayable indicators.

In another embodiment of this disclosure, there is provided a system for generating metronome signals. The system can be implemented as part of a gaming device, a game console, a mobile device, a smart phone, a headset, headphones, and the like. The system can include at least one processor and a memory storing processor-executable codes. The processor can be configured to implement the following operations upon executing the processor-executable codes: receiving or maintaining at least one metronome timing profile, obtaining an audio stream of a computer game, generating the audio stream of the computer game, receiving a player instruction or a software instruction, and, based on the player instruction or the software instruction, generating metronome signals according to the at least one metronome timing profile, wherein the metronome signals and the audio stream are combined and output simultaneously.

In yet further embodiments of the disclosure, there is provided a non-transitory processor-readable medium having instructions stored thereon, which when executed by one or more processors, cause the one or more processors to implement the above-outlined method for providing metronome signals.

Additional novel features of the example embodiments can be set forth in the detailed description, which follows, and can be apparent to those skilled in the art upon examination of the following description and the accompanying drawings or may be learned by production or operation of the examples. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

Figure 1:
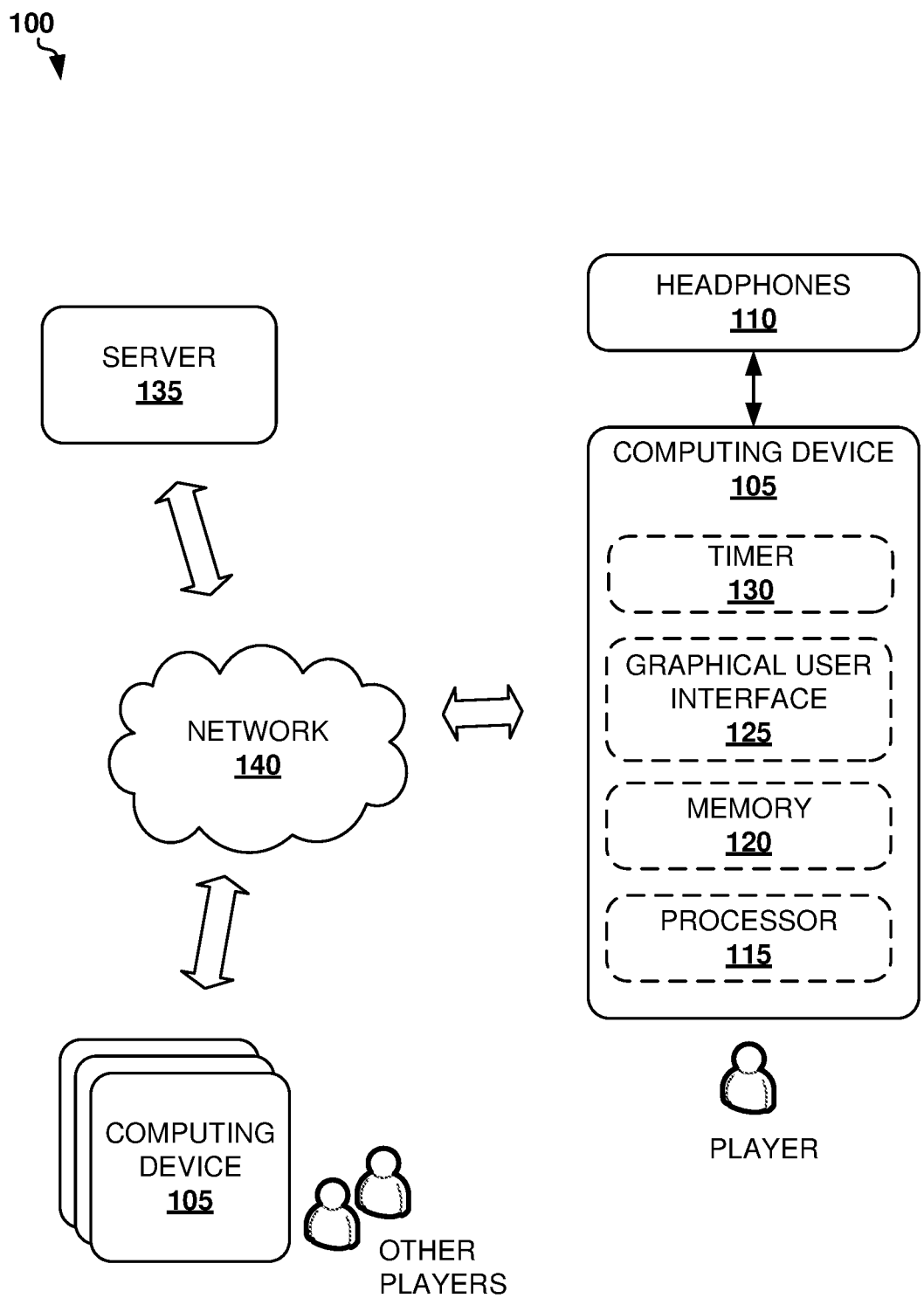
FIG. 1 shows an example system architecture for providing metronome signals, according to one embodiment.

Like reference characters indicate similar components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. In addition, common but well-understood elements that are useful or common in a commercially feasible embodiment are often not depicted in order to facilitate a less obstructed view of these various embodiments of the present disclosure.

DETAILED DESCRIPTION OF EXAMPLE EMBODIMENTS

The present disclosure is generally directed to a virtual metronome for computer and video gaming environments. More specifically, the embodiments of this disclosure include methods and systems for providing metronome signals to assist players in training and practicing their gaming skills. These methods and systems can also be used to enhance performance at game tournaments (not limited to practice or training). The methods can be implemented by computing devices such as a mobile device, a smart phone, a personal computer, a gaming console, and the like. The metronome signals can be generated based on predetermined player settings and output via headphones, a headset, speakers, or any other output device. In providing the settings for metronome signals, players can select designated sounds, frequencies for the metronome signals, duty cycles, and also provide instructions as to whether the metronome signals are one-time signals (i.e., reminders, alarms) or recurring metronome signals that are repeatedly generated with a predetermined frequency.

The players can also create one or more metronome timing profiles. Each metronome timing profile can include instructions for the computing device as to when and how the metronome signals are to be generated based on the player settings. Thus, each metronome timing profile can include policies for one or more virtual metronomes. For example, a player can create a first virtual metronome which, when activated, instructs the computing device to periodically generate first metronome signals with a first frequency. The player can also create a second virtual metronome which, when activated, instructs the computing device to generate a second, non-recurring metronome signal at predetermined times. The player can also create a third virtual metronome which, when activated, instructs the computing device to periodically generate third metronome signals with a frequency and sound different from the first metronome signals.

In some implementations, a player can share the metronome timing profiles with other players, or use (download) metronome timing profiles of other players. Moreover, in addition to the audio metronome signals, there can be provided audible metronome signals and displayable metronome signals. The audible metronome signals can be mixed or simultaneously output with an audio stream generated by a game.

Thus, competitive e-sport players can train, practice, and compete with specific timings in mind for their computer games. There is no need for the players to use cell phone alarms, "egg" timers, or other separate devices to practice game skills. Moreover, the metronome signals described in this disclosure can be generated such that they are integrated with the audio stream of computer games, and there is no difficulty in hearing the metronome signals by the players. Training and competing with the metronome signals can help improve player gameplay by ingraining certain habits and keeping the player mindful of critical timing windows to give the player a competitive edge.

Furthermore, embodiments of this disclosure can enable players to set and configure metronome signals through a GUI, which allows the players to create one or more metronome timing profiles or update settings of metronome signals. For example, players can set up a recurring 15-second chime to remind them to check a virtual map, a one-time chime after 2 minutes of the game start to check for a sniper rifle spawn, and a recurring 43-second chime to remind the player to complete a map recon loop. All three timers can be saved as a single timing profile, which the player can name as he pleases. The GUI can also be configured to enable the user to start (activate), stop (deactivate), or pause one or more virtual metronomes. In other words, the player can cause starting (activating), stopping (deactivating), or pausing generation of one or more metronome signals. In other embodiments, a computer game or another software can cause one or more virtual metronomes to start (activate), stop (deactivate), or pause.

The metronome timing profiles can be transferable to other players. Accordingly, other players can download metronome timing profiles and take advantage of predetermined timers. This can help other players train and compete more efficiently by leveraging the training profiles of better players (e.g., professional players). Moreover, metronome timing profiles can be linked to certain computer games and available for download so that the players can experience the regimen that professional players use to perfect their gameplay. In addition, some metronome timing profiles can be sold or purchased by players. In yet additional embodiments, the metronome timing profiles or settings of certain metronome signals can depend on or automatically adjusted based on the current complexity level of a game or a player skill level achieved in the game.

The following detailed description of embodiments includes references to the accompanying drawings, which form a part of the detailed description. Approaches described in this section are not prior art to the claims and are not admitted to be prior art by inclusion in this section. Reference throughout this specification to "one embodiment," "an embodiment," "some embodiments," "some implementations" or similar language means that a particular feature, structure, or characteristic described in connection with an example implementation is included in at least one embodiment of the present disclosure. Thus, appearances of the phrases "in one embodiment," "in an embodiment," "in some embodiments," and similar language throughout this specification may, but do not necessarily, all refer to the same embodiment.

Furthermore, the described features, structures, or characteristics of embodiments may be combined in any suitable manner in one or more implementations. In the following description, numerous specific details are provided, such as examples of programming, software modules, user selections, network transactions, hardware modules, hardware circuits, hardware chips, etc., to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Embodiments of this disclosure will now be presented with reference to accompanying drawings which show blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean processor-executable instructions, instruction sets, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more embodiments, the functions described herein may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

The term "computing device" shall be construed to mean any electronic device configured to process digital data and cause headphones or speakers to generate metronome signals. By way of example, and not limitation, some examples of computing devices include a cellular phone, smart phone, user equipment, terminal, mobile phone, Internet phone, tablet computer, laptop computer, personal computer, desktop computer, game computer, game console, virtual reality headset, and so forth. The term "player" shall be construed to mean a user of the computing device.

The term "metronome" shall be construed to mean a device, virtual feature or computer program that generates repeated or non-repeated audible and/or visual signals according to a predetermined timing, schedule, or timing profile. The audible signals can be configurable in a tone, duration, pitch, and so forth. The term "metronome timing schedule" shall be construed to mean an instruction for a computing device instructing the computing device to generate metronome signals based on a predetermined time schedule, player settings, or configurations. The metronome timing schedule is saved in a digital form such as a file.

The terms "computer game" and "video game" can be used interchangeably and shall be construed to mean any user-interactive computer- or microprocessor-controlled game. The term "headphones" shall be construed to mean one or more speakers or loudspeakers to be maintained close to a user's ears. The terms "headphones," "headset," "earbuds," "speakers," and "loudspeakers" shall mean the same and can be used interchangeably.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

FIG. 1 shows an example system architecture 100 for providing metronome signals, according to one example embodiment. System architecture 100 includes a computing device 105 such as mobile device, game console, personal computer, and the like. Computing device 105 can be connected to headphones 110 to output an audio stream of multimedia content such as a computer game. Headphones 110 are also used to output metronome signals in an audible form. In some embodiments, computing device 105 can be integrated into headphones 110. In yet additional embodiments, computing device 105 can be coupled to a game console or another device providing a computer game to a player.

Computing device 105 includes a processor 115 and a memory 120 for storing processor-executable instructions, metronome signals, metronome timing profiles, and settings associated with metronome timing profiles or metronome signals. The processor-executable instructions cause processor 115 to implement at least some operations of the methods for providing metronome signals as disclosed herein. Computing device 105 further includes a GUI 125 enabling the player to activate or deactivate metronome signals, adjust settings associated with metronome timing profiles and metronome signals, and create, adjust, delete, upload, or download metronome timing profiles. Computing device 105 further includes a timer 130 configured to count time or provide clock signals. Timer 130 can generate or cause generation of metronome signals.

In certain embodiments, the player can operate GUI 125 to create or update one or more metronome timing profiles. In additional embodiments, the player can also operate GUI 125 to send or upload one or more metronome timing profiles to server 135 via a communications network 140. In yet additional embodiments, the player can also operate GUI 125 to receive or download one or more metronome timing profiles from server 135 via communications network 140. Thus, server 135 can store and manage certain metronome timing profiles, which can belong to a plurality of users, including professional players. Communications network 140 can refer to any wired, wireless, or optical networks including, for example, the Internet, intranet, local area network (LAN), Personal Area Network (PAN), Wide Area Network (WAN), Virtual Private Network (VPN), cellular phone networks (e.g., packet switching communications network, circuit switching communications network), Bluetooth radio, Ethernet network, an IEEE 802.11-based radio frequency network, IP communications network, or any other data communication network utilizing physical layers, link layer capability, or network layer to carry data packets, or any combinations of the above-listed data networks.

In yet more implementations, the player can operate GUI 125 to share one or more player metronome timing profiles with other players using the same or similar computing device 105. For example, the player metronome timing profiles can be sent from one computing device 105 to another computing device 105 via communications network 140. In addition, the player can operate GUI 125 to receive one or more metronome timing profiles of other players that have been shared with the player.

Figure 2:
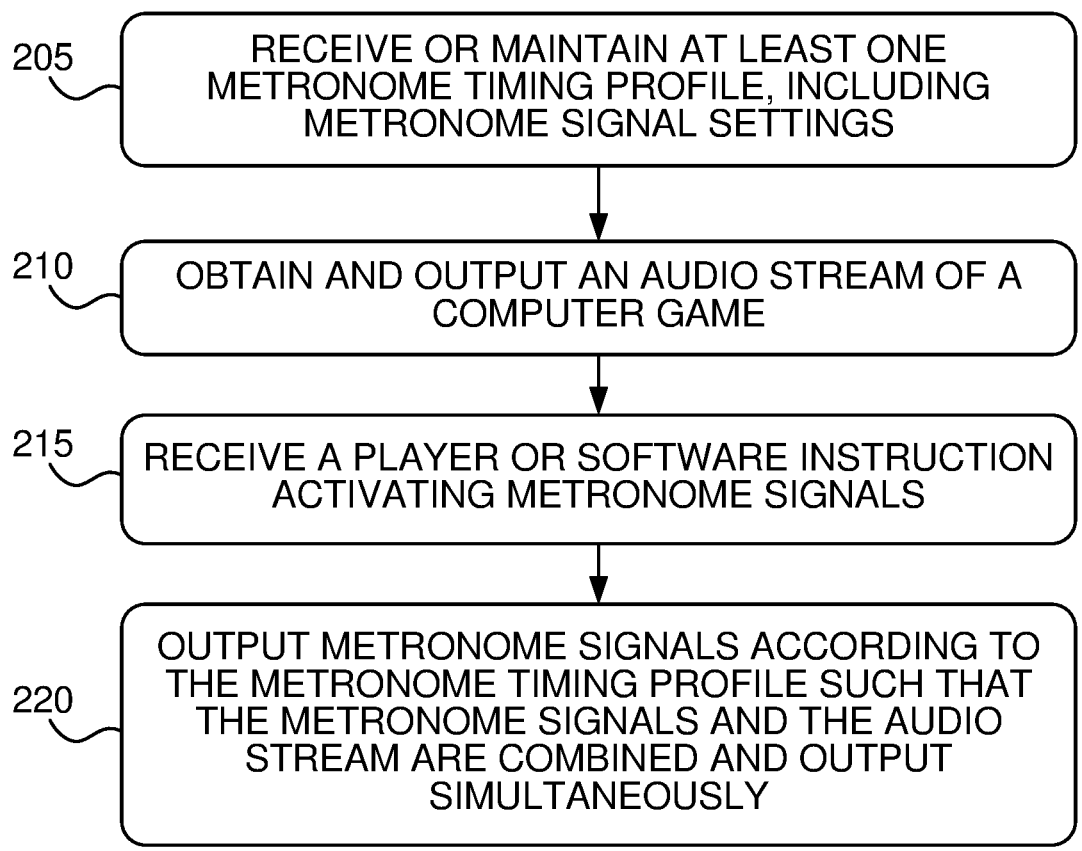
FIG. 2 shows a process flow diagram illustrating a method for providing metronome signals, according to an example embodiment.

FIG. 2 is a process flow diagram showing a method 200 for providing metronome signals according to an example embodiment. Method 200 may be performed by processing logic that may include hardware (e.g., decision-making logic, dedicated logic, programmable logic, application-specific integrated circuit (ASIC)), software (such as software run on a general-purpose computer system or a dedicated machine), or a combination of both. In one example embodiment, the processing logic refers to one or more elements of computing device 105 of FIG. 1. Below recited operations of method 200 may be implemented in an order different than described and shown in the figure. Moreover, method 200 may have additional operations not shown herein, but which can be evident for those skilled in the art from the present disclosure. Method 200 may also have fewer operations than outlined below and shown in FIG. 2.

At operation 205, computing device 105 receives or maintains at least one metronome timing profile. In addition, computing device 105 receives or maintains one or more settings of metronome signals associated with the metronome timing profile. In one example implementation, a metronome timing profile can include instructions on how, what, and when metronome signals shall be generated. In other words, the metronome timing profile includes instructions on how one or more virtual metronomes are to be operated. The metronome timing profile can be created, updated, and uploaded by the player to server 135, downloaded from server 135, and shared with other players. For all of these ends, the player can use GUI 125.

For example, the player can set up a first virtual metronome which, when activated, generates recurring audible metronome signals of a first sound with a first frequency (e.g., every 15 seconds). Further, the player can set up a second virtual metronome which, when activated, generates recurring audible metronome signals of a second sound with a second frequency (e.g., every 23 seconds). In addition, the player can set up a third virtual metronome which, when activated, generates a non-recurring audible metronome signal of third sound after a predetermined period (e.g., two minutes) after a computer game is started. In other words, the third virtual metronome acts as a reminder, alert, stopwatch, or count-down. In additional embodiments, the metronome signals can include displayable indicators, messages, or any other visible information that can be displayed on a screen of computing device 105. For example, the visible information can include a clock or a text message reminding the player to perform certain actions (e.g., "check map" to reminder the player to review a virtual map of a computer game).

As discussed above, the player can set, adjust, or otherwise change any setting of any virtual metronome. For example, the player can select a sound, melody, or any other audible signal or message to be played back by the virtual metronome as metronome signal. The player can also select a frequency, period, or repetition of metronome signals. For example, the player can set a predetermined frequency of metronome signals in a range from about 1 second to about 3,600 seconds. The player can also name metronome signals or virtual metronome. The player can also associate the metronome signals or virtual metronome with a certain computer game such that the metronome signals are automatically generated when the computer game is activated. The player can also associate the metronome signals, virtual metronome, or certain settings of the virtual metronome with a computer game level or player level. For example, a frequency of metronome signals can decrease with the increase of a difficulty level of computer game. Similarly, the frequency of metronome signals can increase with the increase of a player skill level in a particular computer game. Thus, the predetermined frequency of metronome signals can be automatically selected based on the game level or player skill level.

In yet additional embodiments, the metronome signals can be set and generated in two or more duty cycles. Each duty cycle can differ from one another. For example, a first duty cycle can cause generation of metronome signals with first settings (e.g., first sound or first frequency), while a second duty cycle can cause generation of metronome signals with second settings (e.g., second sound or second frequency). The first duty cycle and the second duty cycle are alternating. In other embodiments, there can be more than two duty cycles. Parameters or settings of duty cycles can be set, updated, downloaded, or uploaded by the player via GUI 125.

Still referring to FIG. 2, at operation 210, computing device 105 obtains an audio stream of a computer game and outputs the audio stream via headphones 110 or other speakers. At optional operation 215, computing device 105 receives a player instruction or a software instruction (e.g., a computer game instruction) indicating that certain metronome signals are to be generated based on a selected metronome timing profile. The player instruction or the software instruction can be generated by the player through GUI 125. In additional embodiments, the player instruction or the software instruction can be automatically generated by computing device 105 upon identifying or determining a qualifying event such as a start of the computer game.

At operation 220, computing device 105 generates and outputs the metronome signals via headphones 110. The metronome signals are generated according to the at least one metronome timing profile, the settings, and the player instruction or the software instruction. Notably, computing device 105 combines the metronome signals and the audio stream such that they output simultaneously to the player. Thus, the player can conveniently listen to the audio stream and the metronome signals using the same headphones.

Figure 3:
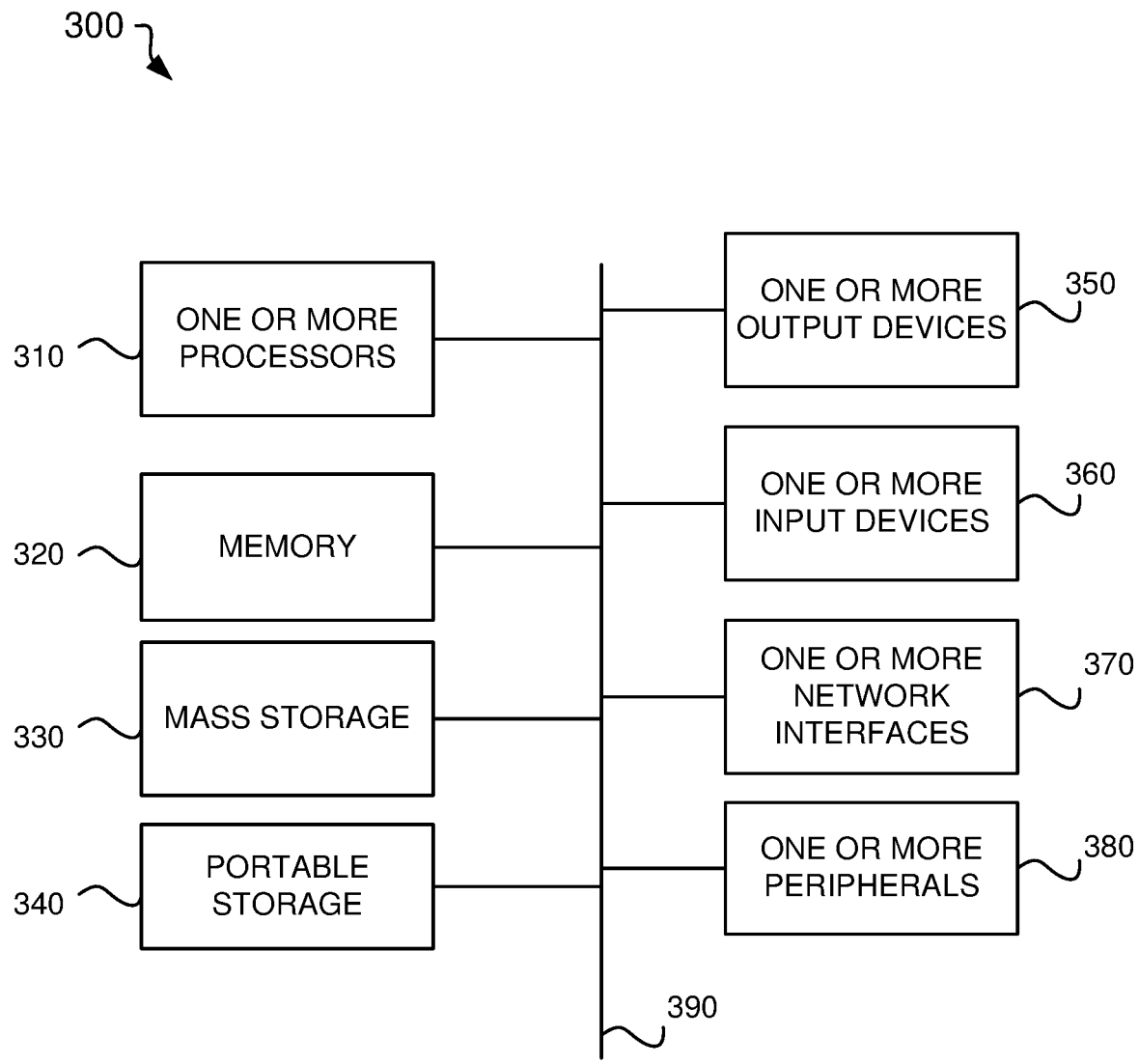
FIG. 3 shows an example computer system that can be used to implement at least some operations of method for providing metronome signals, according to an example embodiment.

FIG. 3 is a high-level block diagram illustrating a computing device 300 suitable for implementing the methods described herein. In particular, computing device 300 may be used for implementing the methods for providing metronome signals as described above. Computing device 300 may include, be, or be an integral part of one or more of a variety of types of devices, such as a mobile device, among others. In some embodiments, computing device 300 can be regarded as an instance of computing device 105.

As shown in FIG. 3, computing device 300 includes one or more processors 310, memory 320, one or more mass storage devices 330, one or more output devices 350, one or more input devices 360, one or more network interfaces 370, one or more optional peripheral devices 380, and a communication bus 390 for operatively interconnecting the above-listed elements. Processors 310 can be configured to implement functionality and/or process instructions for execution within computing device 300. For example, processors 310 may process instructions stored in memory 320 or instructions stored on storage devices 330. Such instructions may include components of an operating system or software applications.

Memory 320, according to one example, is configured to store information within computing device 300 during operation. For example, memory 320 can store settings of metronome signals or metronome timing profiles. Memory 320, in some example embodiments, may refer to a non-transitory computer-readable storage medium or a computer-readable storage device. In some examples, memory 320 is a temporary memory, meaning that a primary purpose of memory 320 may not be long-term storage. Memory 320 may also refer to a volatile memory, meaning that memory 320 does not maintain stored contents when memory 320 is not receiving power. Examples of volatile memories include RAM, dynamic random access memories (DRAM), static random access memories (SRAM), and other forms of volatile memories known in the art. In some examples, memory 320 is used to store program instructions for execution by processors 310. Memory 320, in one example, is used by software applications or mobile applications. Generally, software or mobile applications refer to software applications suitable for implementing at least some operations of the methods as described herein.

Mass storage devices 330 can also include one or more transitory or non-transitory computer-readable storage media or computer-readable storage devices. For example, memory 320 can store instructions for processor 310, metronome signals, settings of metronome signals, and metronome timing profiles. In some embodiments, mass storage devices 330 may be configured to store greater amounts of information than memory 320. Mass storage devices 330 may also be configured for long-term storage of information. In some examples, mass storage devices 330 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Computing device 300 may also include one or more optional input devices 360. Input devices 360 may be configured to receive input from a player through tactile, audio, video, or biometric channels. Examples of input devices 360 may include a keyboard, keypad, mouse, trackball, touchscreen, touchpad, microphone, video camera, image sensor, fingerprint sensor, or any other device capable of detecting an input from the player or other source, and relaying the input to computing device 300 or components thereof.

Optional output devices 350 may be configured to provide output to the player through visual or auditory channels. Output devices 350 may include a video graphics adapter card, display, such as liquid crystal display (LCD) monitor, light emitting diode (LED) monitor, or organic LED monitor, sound card, speaker, headphones, headset, virtual reality headset, projector, or any other device capable of generating output that may be intelligible to a player. Output devices 350 may also include a touchscreen, presence-sensitive display, or other input/output capable displays known in the art.

Computing device 300 can also include network interface 370. Network interface 370 can be utilized to communicate with external devices via one or more communications networks such as communications network 140 or any other wired, wireless, or optical networks. Network interface 370 may be a network interface card, such as an Ethernet card, an optical transceiver, a radio frequency transceiver, or any other type of device that can send and receive information.

An operating system of computing device 300 may control one or more functionalities of computing device 300 or components thereof. For example, the operating system may interact with the software applications or mobile applications and may facilitate one or more interactions between the software/mobile applications and processors 310, memory 320, storage devices 330, input devices 360, output devices 350, and network interface 370. The operating system may interact with or be otherwise coupled to software applications or components thereof. In some embodiments, software or mobile applications may be included in the operating system.

Thus, methods and systems for providing metronome signals have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for providing metronome signals during game play of a computer game, the method comprising:
  receiving or maintaining, by a computing device, at least one metronome timing profile;
  obtaining, by the computing device, an audio stream of a computer game;
  causing, by the computing device, output of the audio stream of the computer game to at least one loudspeaker of the computing device or headphones;
  receiving, by the computing device, a player instruction or a software instruction; and
  based on the player instruction or the software instruction, generating, by the computing device, metronome signals according to the at least one metronome timing profile, wherein the metronome signals are audio signals integrated with the audio stream and caused to be output simultaneously to a player such that the player is aided in hearing both the metronome signals and the audio stream using the at least one loudspeaker;
  wherein at least two of the metronome signals are repeated while the player continues to play the computer game.

2. The method of claim 1, further comprising:
  obtaining, by the computing device, one or more settings for the metronome signals, wherein the metronome signals are caused, by the computing device, to be output through the headphones according to the at least one metronome timing profile and the one or more settings.

3. The method of claim 2, wherein the one or more settings include a sound selection of the metronome signals.

4. The method of claim 2, wherein the one or more settings include a frequency of generating the metronome signals.

5. The method of claim 2, wherein the one or more settings include an instruction concerning recurrence of metronome signals.

6. The method of claim 1, wherein the at least one metronome timing profile is configured to cause generating the metronome signals repeatedly with a predetermined frequency.

7. The method of claim 6, wherein the predetermined frequency is within a range of about 1 second to about 3,600 seconds.

8. The method of claim 6, wherein the predetermined frequency is automatically selected based on a game level or a player skill level.

9. The method of claim 6, wherein the predetermined frequency includes at least a first duty cycle and a second duty cycle, wherein a frequency of the first duty cycle differs from a frequency of the second duty cycle.

10. The method of claim 1, further comprising:
sharing, by the computing device, the at least one metronome timing profile with another computing device based on a player input by the computing device.

11. The method of claim 1, further comprising:
providing, by the computing device, a graphical user interface to enable the player to create and update the at least one metronome timing profile, wherein the graphical user interface is further configured to enable the player to activate and deactivate the generating of the metronome signals.

12. The method of claim 1, wherein the computing device is integrated into the headphones.

13. The method of claim 1, wherein the computing device includes a game console or mobile device.

14. A system for providing metronome signals during game play of a computer game, the system comprising:
at least one processor and a memory storing processor-executable codes, wherein the at least one processor is configured to implement the following operations upon executing the processor-executable codes:
receiving or maintaining at least one metronome timing profile;
obtaining an audio stream of a computer game;
causing output of the audio stream of the computer game to at least one loudspeaker of a computing device or headphones;
receiving a player instruction or a software instruction; and
based on the player instruction or the software instruction, generating metronome signals according to the at least one metronome timing profile, wherein the metronome signals are audio signals integrated with the audio stream and caused to be output simultaneously to a player such that the player is aided in hearing both the metronome signals and the audio stream using the at least one loudspeaker;
wherein at least two of the metronome signals are repeated while the player continues to play the computer game.

15. The system of claim 14, wherein the at least one processor is further configured to implement the following operation upon executing the processor-executable codes:
obtaining one or more settings for the metronome signals, wherein the metronome signals are caused, by the computing device, to be output through headphones according to the at least one metronome timing profile and the one or more settings, and wherein the one or more settings include a sound selection of the metronome signals and a frequency of generating the metronome signals.

16. The system of claim 14, wherein the at least one processor is further configured to implement the following operation upon executing the processor-executable codes:
sharing the at least one metronome timing profile with another computing device based on a player input by the computing device.

17. The system of claim 14, wherein the at least one processor is further configured to implement the following operation upon executing the processor-executable codes:
providing a graphical user interface to enable the player to create and update the at least one metronome timing profile, wherein the graphical user interface is further configured to enable the player to activate and deactivate the generating of the metronome signals.

18. A non-transitory processor-readable medium having instructions stored thereon, which when executed by one or more processors, cause the one or more processors to implement a method for providing metronome signals during game play of a computer game, the method comprising:
receiving or maintaining, by a computing device, at least one metronome timing profile;
obtaining, by the computing device, an audio stream of a computer game;
causing, by the computing device, output of the audio stream of the computer game to at least one loudspeaker of the computing device or headphones;
receiving, by the computing device, a player instruction or a software instruction; and
based on the player instruction or the software instruction, generating, by the computing device, metronome signals according to the at least one metronome timing profile, wherein the metronome signals are audio signals integrated with the audio stream and caused to be output simultaneously to a player such that the player is aided in hearing both the metronome signals and the audio stream using the at least one loudspeaker;
wherein at least two of the metronome signals are repeated while the player continues to play the computer game.

* * * * *